July 25, 1939.  A. E. HENDERSON  2,167,044
PEANUT HARVESTER
Filed Dec. 4, 1936  3 Sheets-Sheet 1

Inventor,
Albert E. Henderson,
By Baldwin & Wight
Attorneys

July 25, 1939.    A. E. HENDERSON    2,167,044
PEANUT HARVESTER
Filed Dec. 4, 1936    3 Sheets-Sheet 2
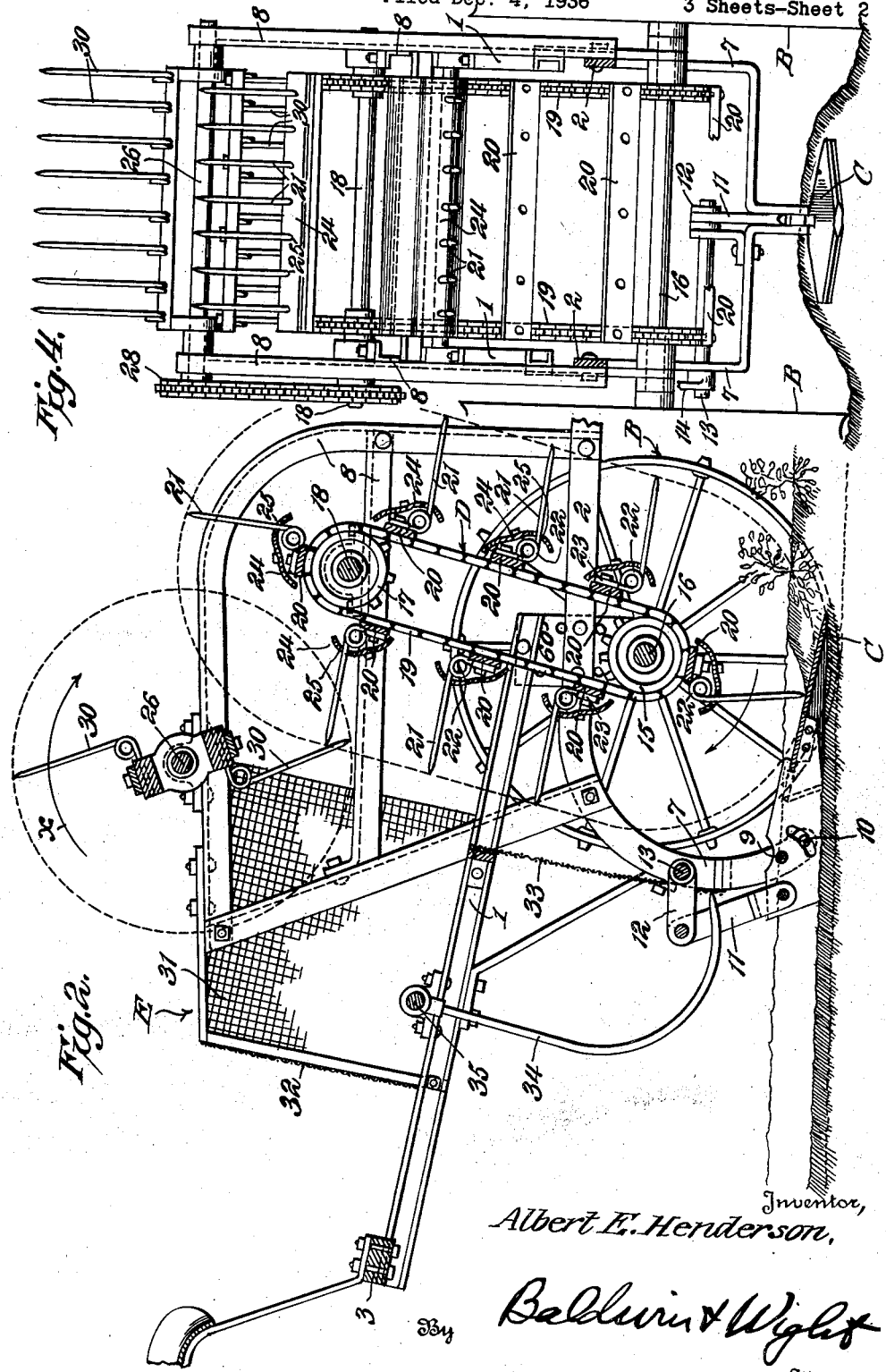
Inventor,
Albert E. Henderson,
By Baldwin & Wight
Attorneys.

July 25, 1939.                A. E. HENDERSON                2,167,044
                              PEANUT HARVESTER
                            Filed Dec. 4, 1936              3 Sheets-Sheet 3
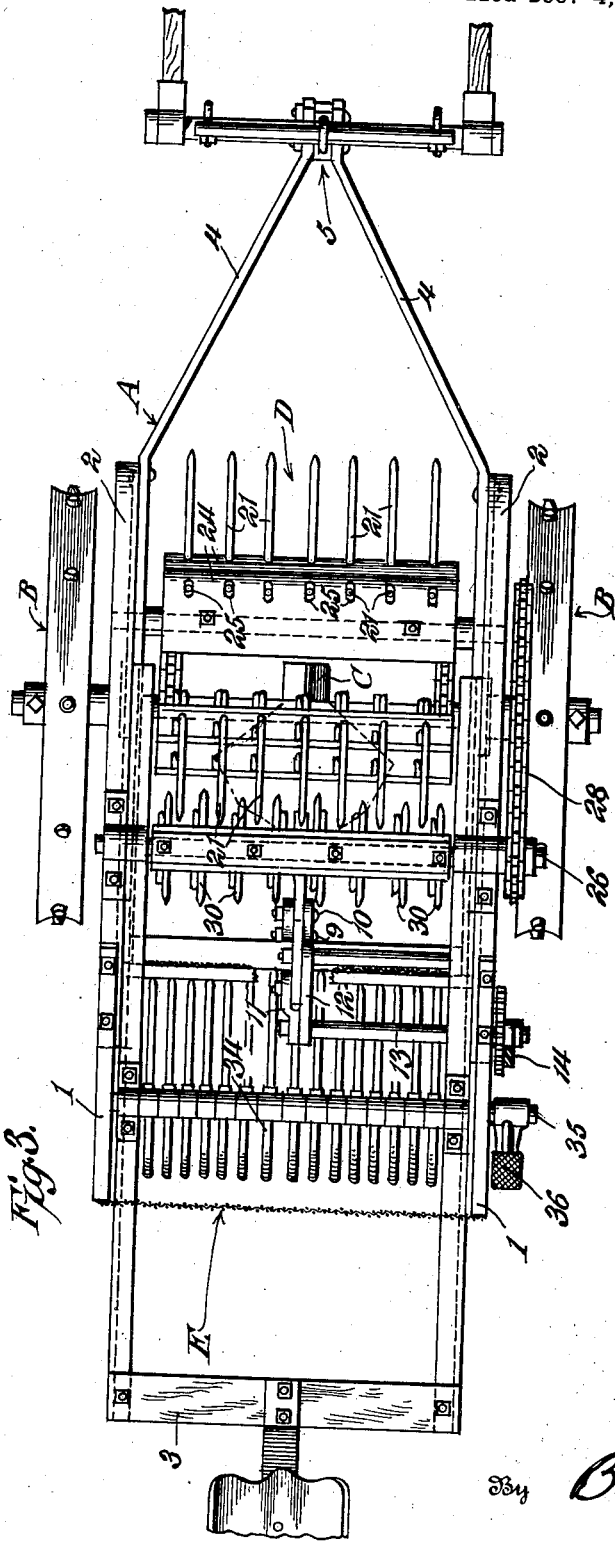
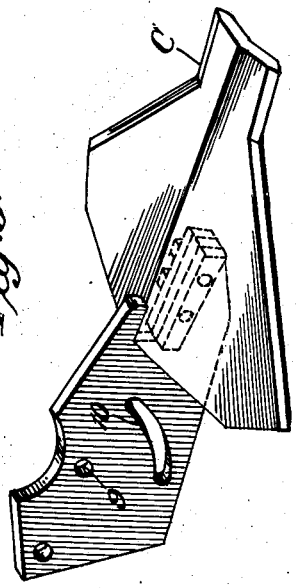
Inventor,
Albert E. Henderson,
By Baldwin & Wight
Attorneys.

Patented July 25, 1939

2,167,044

UNITED STATES PATENT OFFICE 2,167,044

PEANUT HARVESTER

Albert E. Henderson, Albany, Ga., assignor, by mesne assignments, to Henderson, Inc.

Application December 4, 1936, Serial No. 114,242

12 Claims. (Cl. 55—134)

This invention relates to harvesters, and more particularly to peanut harvesters.

At present the prevailing, if not the almost universal, practice of harvesting peanuts is by manual labor. The average farmer can not maintain a corps of workers large enough to harvest his crop rapidly when it has ripened to just the right point. Instead he must depend on hiring extra hands temporarily, but, since it frequently happens that the crops of a number of farmers in the same locality ripen at the same time, it often is impossible to obtain the desired extra help. Consequently it may be necessary to delay harvesting until some time after the peanuts are ripe and ready to harvest, or in some cases the crops are harvested before the peanuts actually are ripe. If peanuts are left unharvested after they are ripe the stems running from the individual nuts to the vine will rot, releasing the peanuts from the vine so that they are lost. Furthermore, if the ground is damp, the nuts will sprout, spoiling the crop. The objections to harvesting the crop before it is ready or some time after it is ready are therefore apparent.

These and other objections to manual harvesting of peanut crops have resulted in many efforts and proposals to provide peanut harvesting machines, but as far as I am aware no such machine capable of really practical use has been provided prior to the present invention. A common failing of such prior machines as have actually been constructed and tried out in the field is that they pick the vine up from the ground and cause dirt to fall on top of at least a part of the vines and peanuts. This dirt adheres to the vines and the manual labor required subsequently to separate the vines and peanuts from the dirt is as much as or more than would be required to harvest the peanuts without the aid of a machine.

An object of my invention is to provide a machine capable of harvesting peanuts in a manner to overcome the operating difficulties inherent in prior machines.

Another object is to provide a peanut harvester adapted to raise slightly the ground and peanut plants without turning the vines over and to raise the plants away from the ground so as to prevent dirt from dropping on the plants.

A further object is to provide an improved arrangement of ground-engaging and plant-loosening means, and plant-elevating or conveying means, such that the conveying means cooperates with the ground-engaging means to free the plants from the earth before they are lifted and conveyed.

The foregoing recitation of some objects is not to be understood as a complete statement of the objects of my invention, since there are other objects which will become apparent from a reading of the detailed description to follow, the appended claims, and the accompanying drawings, in which:

Figure 2 is a longitudinal sectional view, with some parts shown in elevation;

Figure 3 is a top plan view;

Figure 4 is a vertical sectional view taken on the line 4—4 of Figure 1; and

Figure 5 is a perspective view of a plow element, drawn on an enlarged scale.

Figure 1:
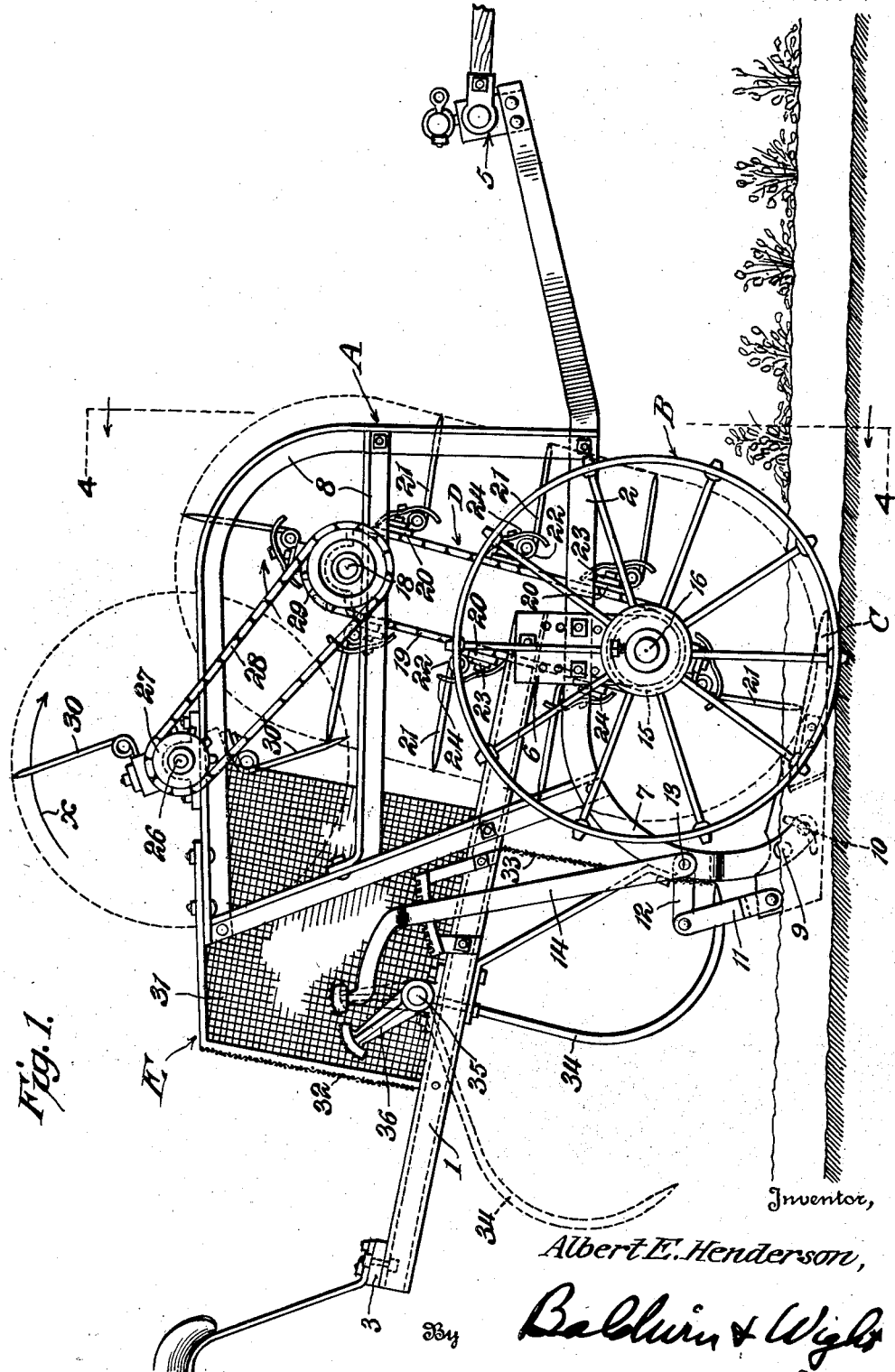
Figure 1 is a side elevation of a harvester embodying the invention.

The harvester shown in the drawings as illustrating one of the forms in which the invention may be embodied comprises a frame generally designated A, ground wheels B, a plow C, conveying means generally designated D; and plant-receiving and gathering means generally designated E. The operation, considered in a broad aspect, includes loosening of the peanut plants by the plow C, raising of the plants by the conveying means D, and delivery of the plants to the plant-receiving and gathering means E.

The frame A comprises two lower rear side members 1—1, two lower front side members 2—2, a rear cross member 3 connecting the rear members 1—1, and inclined portions 4—4 connecting the front side members 2 and terminating at a draft connection 5. The members 1 and 2 on each side of the frame are connected to axle brackets 6. The parts thus far described form an open frame within which is positioned harvesting and conveying mechanism to be described later. The members 2 project rearwardly beyond the axle plates 6 and are curved downwardly as at 7 to provide a support for the plow C. The frame A also includes a super-structure or upper frame part 8 for mounting the conveyor mechanism to be described.

In accordance with the invention, the plow C is shaped and mounted so as to run mainly under the surface of the ground. The plow is shallow with a slight rise at the center, as is apparent from a consideration of Figure 5, and it will be noted that the top surface of the plow is unobstructed, the attaching means being connected below the plow. Preferably, the plow is mounted in a manner to permit its adjustment, and to this end the plow is carried to rock about a pivot 9 on the frame member 2 extension 7, a pin-and-slot connection 10 serving to limit the rocking movement of the plow and to provide lateral support. Adjusting movement of the plow is provided for by a link 11 connected to the plow behind the pivot 10, a crank arm 12 secured to a shaft 13, and a foot lever 14 likewise secured to the shaft. In operation, the plow moves along mainly under the surface of the ground and lifts the ground and peanut plants slightly, loosening the dirt without turning the dirt and plants over.

In accordance with the invention, the plants are lifted from the plow and moved away from the ground in a manner to prevent dirt from being deposited on the plants. To accomplish this purpose, I provide conveying mechanism which, in the form shown, includes lower sprocket wheels 15 secured to the wheel axle 16 on each side of the machine, upper sprocket wheels 17 mounted on a cross shaft 18 carried by the frame superstructure 8, and a flexible endless conveyor comprising two chains 19 trained over the sprocket wheels 15 and 17 on opposite sides of the machine respectively. Cross bars or flights 20 extend transversely between the chains 19 in spaced relation. On each cross bar is mounted a plurality of spaced plant-carrying spring fingers 21, each of which is formed adjacent its inner end with a coil or convolute portion 22, the short protruding end of which is clamped against the bar 20 by a second bar 23. This provides for a desired amount of resiliency and flexing of the fingers 21, and, in order to prevent the coil or convolute portions 22 from snaring or catching plants, I provide each transverse row of fingers with a guard plate 24. These guards are mounted so as to cover the convolute portions 22, and are provided with openings 25 through which the fingers extend respectively, the openings 25 being elongated in the direction of travel of the conveyor and consequently in the direction of flexing of the fingers 21.

When the harvester is in operation, the conveyor will move around in the same general direction of rotation as the ground wheels B, and the lowermost portion of the conveyor will move oppositely to the direction of travel of the machine. The fingers 21 are of such length and the axis of the lower sprocket wheels 15 is so located with respect to the plow that the fingers will pass directly over the plow and engage or nearly engage the top surface of the plow along a line in advance of the trailing edge of the plow. In this way the fingers will extend down into the earth and peanut plants which have been slightly raised and loosened by the plow. At this time the fingers will agitate the plants so as to cause the dirt to drop off, and as the fingers continue onward and thence upward along the back back stretch of the conveyor they will carry the plants upward in such manner that the plants are not turned over and no dirt is deposited upon the plants once they are removed from the ground. I have found that this desirable mode of operation is best attained by positioning the lower sprocket wheels 15 in advance of the rear or trailing edge of the plow, and by positioning the upper sprocket wheels 17 with their common axis above and in advance of the axis of the lower sprocket wheels, the arrangement being such that the conveyor, considered as a whole, is inclined upwardly and forwardly from the ground wheel axle 16.

It is important to prevent the plants carried by the conveyor from continuing upward and over the sprocket wheels 17. For this reason I provide plant-displacing means comprising a shaft 26 carried by the frame super-structure 8 and adapted to be operated through the medium of a sprocket 27 on the shaft, a chain 28 trained thereover, and a sprocket 29 on the shaft 18. The shaft 26 carries plant-displacing fingers 30 which are staggered with respect to the fingers 21 on the conveyor and are so arranged as to overlap and interlace with the fingers 21. The shaft 26 rotates in the direction of the arrow X in Figure 2, so that, as the fingers 30 come down, they will engage plants carried upward on the fingers 21 of the conveyor and will kick them rearward clear of the fingers 21. In this way the plants are displaced or stripped from the conveyor before reaching the extreme upper part of the travel thereof.

I also prefer to provide means for receiving the plants displaced from the conveyor, and in the form shown the plant-receiving means comprises metal screen sides 31—31, a metal screen back part 32, and a metal screen front part 33 which prevents plants from falling back on to the conveyor fingers 21 thereof. The plant-receiving means normally is closed at its bottom by a rake 34 in its normal position shown in full lines in Figures 1 and 2. Plants kicked or thrown rearward from the conveyor fingers 21 will drop down through the screen parts 31—31 and 32 and will be caught by a movable bottom 34 carried by a cross shaft 35. When a desired quantity of plants has thus been deposited on the bottom 34 the latter is swung backwardly by means of a foot pedal 36 to drop the plants to the ground in a pile, after which the bottom 34 is returned to its full line position. The construction and coaction of the parts is such that the plow lifts a crest of earth (without turning it over), and a single uprightly disposed endless conveyor dips its spring teeth into the crest of earth directly over the plow. This arrangement avoids all throwing about, tearing, twisting, crushing, or other rough treatment of the vines such as would displace the nuts and result in loss thereof, and provides for a gentle gathering of the vines without any objectionable loss of nuts.

It is apparent that I have provided a harvester having numerous advantages, one of the important advantages being the construction and operation which avoids the depositing of dirt on the plants after they have been removed from the ground. This feature alone constitutes a vast improvement over the prior art, but other features pointed out in the description also are important. The machine disclosed herein has been used extensively in the harvesting of large crops of peanuts, and is therefore the at present preferred embodiment of the invention. However, it will be appreciated that various changes may be made in the construction and arrangement of the parts without departing from the invention as defined in the claims.

I claim:

1. In a mobile peanut harvester, a plow; a moving conveyor equipped with plant-engaging and carrying fingers; and means mounting said conveyor in such position relative to the plow that the tips of certain of said fingers will pass over and contact said plow intermediate its ends and while so doing will travel below the normal ground level adjacent the plow.

2. In a mobile peanut harvester, a plow shaped to raise and loosen dirt and plants without turning the dirt or plants over; an endless conveyor equipped with plant-engaging and carrying fingers and having the flights thereof disposed uprightly; and means mounting said conveyor in such position relative to the plow that the tips of said fingers when travelling through the lowermost part of their path will project into the dirt loosened by the plow and the lowermost portion of the path of said fingers extending throughout a limited area intermediate of the leading and trailing ends of the plow.

3. In a mobile peanut harvester, a plow shaped to raise and loosen dirt and plants without turning them; means mounting the plow to travel mainly below the ground level; an endless conveyor equipped with plant-carrying fingers and having the flights thereof disposed uprightly; and means mounting the conveyor in such position relative to the plow that certain of said fingers, during a part of their travel, will extend below the normal ground level and pass through and agitate the dirt loosened by the plow, contact said plow intermediate its ends, and pick up the plants and lift them clear of said loosened dirt.

4. In a mobile peanut harvester, a plow shaped to raise and loosen dirt and plants positioned to travel mainly below the ground level; an endless conveyor; a lower wheel over which the conveyor is trained and the axis of which is in advance of the trailing end of the plow; an upper wheel over which the conveyor is trained and the axis of which is positioned in advance of the axis of the lower wheel; means for mounting and driving said conveyor so that its lowermost portion runs in a direction opposite to the direction of travel of the harvester and in close proximity to the normal ground level; and means for displacing plants from said conveyor rearwardly before the plants can pass over said upper wheel.

5. In a mobile peanut harvester, ground-engaging and plant-freeing means; an endless conveyor; a lower wheel over which the conveyor is trained; an upper wheel over which the conveyor is trained and which has its axis disposed in advance of the axis of said lower wheel, the location of said axes positioning said conveyor to be inclined upwardly and forwardly; means for driving said conveyor in such direction that its rear stretch travels upwardly; and means adjacent the rear side and top portion of said conveyor for removing plants from the rear side thereof before said plants can pass over said upper wheel.

6. In a mobile peanut harvester, ground-engaging and plant-freeing means; an endless conveyor, a lower wheel over which the conveyor is trained; an upper wheel over which the conveyor is trained and which has its axis disposed in advance of the axis of said lower wheel, the location of said axes positioning said conveyor to be inclined upwardly and forwardly; means for driving said conveyor in such direction that its rear stretch travels upwardly; means adjacent the rear side and top portion of said conveyor for removing plants from the rear side thereof before said plants can pass over said upper wheel; and plant-receiving means disposed to the rear of said plant-removing means.

7. In a mobile peanut harvester, ground-engaging and plant-freeing means; an endless conveyor; a lower wheel over which the conveyor is trained; an upper wheel over which the conveyor is trained and which has its axis disposed in advance of the axis of said lower wheel, the location of said axes positioning said conveyor to be inclined upwardly and forwardly; means for driving said conveyor in such direction that its rear stretch travels upwardly; means adjacent the rear side of said conveyor for removing plants from the rear side thereof before said plants can pass over said upper wheel; open bottom plant-receiving means disposed to the rear of said plant-removing means and having a bottom mounted for movement to closed position for catching plants discharged by said conveyor and to open position to drop plants upon the ground.

8. In a mobile peanut harvester, ground-engaging and plant-freeing means; a flexible endless conveyor; a lower rotating member over which the conveyor is trained; an upper rotating member over which the conveyor is trained and which has its axis disposed forwardly of the axis of said lower rotating member, the axes of both of said members being transverse to the direction of movement of the harvester; a plurality of transverse rows of spaced plant-engaging fingers on said conveyor; means for driving said conveyor in a direction such that its front stretch moves downwardly and its rear stretch moves upwardly; and means for displacing plants from the upwardly moving rear conveyor stretch comprising a part mounted to rotate about a transverse axis to the rear of the conveyor and having a row of spaced fingers staggered with respect to the fingers on the conveyor and adapted to pass between conveyor fingers in overlapping relation thereto, and means for driving said rotating part in the same direction of rotation as the rotating members over which the conveyor is trained.

9. In a peanut harvester, a plow for lifting a crest of earth, an endless flexible conveyor; plant-engaging and carrying fingers attached to the conveyor and positioned to dip into the earth crest directly over the plow, said fingers being formed of springy material and having spring coils or convolutions adjacent the points of attachment of the fingers to the conveyor, said coils being wound so as to tend to tighten as the fingers engage the earth crest; and guard plates carried by the conveyor and covering said convolutions to prevent the latter from catching plants being conveyed.

10. In a peanut harvester, a plow for lifting a crest of earth, an endless flexible conveyor; plant-engaging and carrying fingers attached to the conveyor and positioned to dip into the earth crest directly over the plow, said fingers being formed of springy material and having spring coils or convolutions adjacent the points of attachment of the fingers to the conveyor, said coils being wound so as to tend to tighten as the fingers engage the earth crest; and guard plates carried by the conveyor and covering said convolutions to prevent the latter from catching plants being conveyed, said guard plates having openings through which the fingers extend, said openings being elongated in the direction of travel of the conveyor and hence in the direction of flexing of the fingers whereby the guard plates will not interfere with flexing of the fingers about their coil or convolute portions.

11. In a mobile peanut harvester, a frame including side members, a rear cross member, and means connecting the side members at the front of the machine; a plow mounted on said frame between the side members for travelling mainly submerged or under the earth; a transverse axle on said frame; ground wheels on said axle; an endless conveyor positioned between the side members of said frame; and upper and lower rotating means over which the conveyor is trained, the lower rotating means having a transverse axis located in advance of the trailing end of the submerged portion of the plow.

12. In a mobile peanut harvester, a frame including side members, a rear cross member, and means connecting the side members at the front of the machine; a plow mounted on said frame between the side members for travelling mainly submerged or under the earth; a transverse axle on said frame; ground wheels on said axle; an endless conveyor positioned between the side members of said frame; and upper and lower rotating means over which the conveyor is trained, the lower rotating means having a transverse axis located in advance of the trailing end of the submerged portion of the plow and the upper rotating means having a transverse axis located in advance of the axis of said lower rotating means.

ALBERT E. HENDERSON.